(12) United States Patent
Parkvall et al.

(10) Patent No.: US 7,359,359 B2
(45) Date of Patent: Apr. 15, 2008

(54) METHOD AND SYSTEM OF CHANNEL ADAPTATION

(75) Inventors: Stefan Parkvall, Stockholm (SE); Erik Dahlman, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 301 days.

(21) Appl. No.: 10/545,264

(22) PCT Filed: Feb. 17, 2004

(86) PCT No.: PCT/SE2004/000159

§ 371 (c)(1),
(2), (4) Date: Aug. 10, 2005

(87) PCT Pub. No.: WO2004/073250

PCT Pub. Date: Aug. 26, 2004

(65) Prior Publication Data

US 2006/0098688 A1    May 11, 2006

(30) Foreign Application Priority Data

Feb. 17, 2003  (SE) .................................. 0300443

(51) Int. Cl.
*H04B 7/212* (2006.01)
*H04Q 11/00* (2006.01)
(52) U.S. Cl. .................. 370/337; 370/376; 370/477
(58) Field of Classification Search ............ 370/337, 370/477, 376, 342, 445, 345, 441, 442, 479, 370/458
See application file for complete search history.

(56) References Cited

U.S. PATENT DOCUMENTS

| | | | |
|---|---|---|---|
| 6,088,326 A * | 7/2000 | Lysejko et al. | 370/209 |
| 6,222,819 B1 * | 4/2001 | Lysejko et al. | 370/209 |
| 6,760,365 B2 * | 7/2004 | Demir et al. | 375/150 |
| 2003/0181183 A1 * | 9/2003 | Ventura | 455/258 |
| 2004/0052271 A1 * | 3/2004 | Yu | 370/445 |
| 2007/0058595 A1 * | 3/2007 | Classon et al. | 370/337 |
| 2007/0165620 A1 * | 7/2007 | Li et al. | 370/376 |

FOREIGN PATENT DOCUMENTS

EP        1286491 A1    2/2004

OTHER PUBLICATIONS

Parkvall, S. et al. "The Evolution of WCDMA Towards Higher Speed Downlink Packet Data Access", IEEE VTS 53$^{rd}$ Vehicular Technology Conference, 2001. VTC 2001 Spring. Rhodes, Greece, May 6-9, 2001, vol. 3, pp. 2287-2291, INSPEC AN: 7183786.

Das, A et al. "Adaptive, Asynchronous Incremental Reduncacy (A/sup 2/IR) with Fixed Transmission Time Intervals (TTI) for HSDPA", The $13_{th}$ IEEE International Symposium on Personal, Indoor and Mobile Radio Communications, 2002. Sep. 15-18, 2002, vol. 3, pp. 1083-1087, INSPEC AN: 7678046.

Swedish Patent Office, International Search Report for PCT/SE2004/000159, dated May 19, 2004.

* cited by examiner

*Primary Examiner*—Sonny Trinh
(74) *Attorney, Agent, or Firm*—Roger S. Burleigh

(57) ABSTRACT

The present invention relates to transmissions and retransmissions in a communications system. It reveals a method and system for backward compatible detection of an introduced channel sub-frame structure particularly well suited for data transmissions. The invention is well suited for a cellular mobile radio communications system, particularly a Universal Mobile Telecommunications System, UMTS.

30 Claims, 8 Drawing Sheets

METHOD AND SYSTEM OF CHANNEL ADAPTATION

TECHNICAL FIELD OF THE INVENTION

The present invention relates to transmissions and retransmissions in a communications system, and more especially it relates to a cellular mobile radio system, particularly to a Universal Mobile Telecommunications System, UMTS or WCDMA system.

BACKGROUND AND DESCRIPTION OF RELATED ART

Transmission and retransmission of data to or from a mobile station, MS, or user equipment, UE, is previously known. It is also known to use medium access control and radio link control layers of a UMTS protocol structure in acknowledged mode for dedicated channels.

In acknowledged mode, retransmissions are undertaken in case of detected transmission errors not recovered by forward error control. This is also called automatic repeat request, ARQ. With ARQ, retransmissions can be undertaken unless a transmitted message is (positively) acknowledged or if it is negatively acknowledged. Generally there are time limits for the respective positive and negative acknowledgements to be considered.

Within this patent application, a radio network controller, RNC, is understood as a network element including a radio resource controller. Node B is a logical node responsible for radio transmission/reception in one or more cells to/from a User Equipment. A base station, BS, is a physical entity representing Node B.

Medium access control, MAC, and radio link control, RLC, is used within radio communications systems like General Packet Radio Services, GPRS, and UMTS.

With reference to FIG. 1, Node B1 and Node B2 of a radio communications system are logical nodes responsible for radio transmission/reception in one or more cells to/from the User Equipment UE. BS1 and BS2 are physical entities representing Node B1 and Node B2 respectively. Node B1 and Node B2 terminate the air interface, called Uu interface within UMTS, between UE and respective Node B towards the radio network controller RNC. In UMTS the interface between a Node B and an RNC is called Iub interface.

$3^{rd}$ Generation Partnership Project (3GPP): *Technical Specification Group Radio Access Network, Physical Layer Procedures,* 3G TS 25.301 v3.6.0, France, September 2000, specifies in chapter 5 Radio Interface Protocol Architecture of a UMTS system. There are three protocol layers:
  physical layer, layer 1 or L1,
  data link layer, layer 2 or L2, and
  network layer, layer 3 or L3.

Layer 2, L2, and layer 3, L3 are divided into Control and User Planes. Layer 2 consists of two sub-layers, RLC and MAC, for the Control Plane and four sub-layers, BMC, PDCP, RLC and MAC, for the User Plane. The acronyms BMC, PDCP, RLC and MAC denote Broadcast/Multicast Control, Packet Data Convergence Protocol, Radio Link Control and Medium Access Control respectively.

FIG. 2 illustrates a simplified UMTS layers 1 and 2 protocol structure for a Uu Stratum, UuS, or Radio Stratum, between a user equipment UE and a Universal Terrestrial Radio Access Network, UTRAN.

Radio Access Bearers, RABs, make available radio resources (and services) to user applications. For each mobile station there may be one or several RABs. Data flows (in the form of segments) from the RABs are passed to respective Radio Link Control, RLC, entities which amongst other tasks buffer the received data segments. There is one RLC entity for each RAB. In the RLC layer, RABs are mapped onto respective logical channels. A Medium Access Control, MAC, entity receives data transmitted in the logical channels and further maps logical channels onto a set of transport channels. In accordance with subsection 5.3.1.2 of the 3GPP technical specification, MAC should support service multiplexing e.g. for RLC services to be mapped on the same transport channel. In this case identification of multiplexing is contained in the MAC protocol control information.

Transport channels are finally mapped to a single physical channel which has a total bandwidth allocated to it by the network. In frequency division duplex mode, a physical channel is defined by code, frequency and, in the uplink, relative phase (I/Q). In time division duplex mode a physical channel is defined by code, frequency, and time-slot. The DSCH, e.g., is mapped onto one or several physical channels such that a specified part of the downlink resources is employed. As further described in subsection 5.2.2 of the 3GPP technical specification the L1 layer is responsible for error detection on transport channels and indication to higher layer, FEC encoding/decoding and interleaving/deinterleaving of transport channels.

PDCP provides mapping between Network PDUs (Protocol Data Units) of a network protocol, e.g. the Internet protocol, to an RLC entity. PDCP compresses and decompresses redundant Network PDU control information (header compression and decompression).

For transmissions on point-to-multipoint logical channels, BMC stores at UTRAN-side Broadcast Messages received from an RNC, calculates the required transmission rate and requests for the appropriate channel resources. It receives scheduling information from the RNC, and generates schedule messages. For transmission, the messages are mapped on a point-to-multipoint logical channel. At the UE side, BMC evaluates the schedule messages and deliver Broadcast Messages to upper layer in the UE.

3G TS 25.301 also describes protocol termination, i.e. in which node of UTRAN the radio interface protocols are terminated, or equivalently, where within UTRAN the respective protocol services are accessible.

$3^{rd}$ Generation Partnership Project (3GPP): *Technical Specification Group Radio Access Network, Physical Layer Procedures,* 3G TS 25.322 v3.5.0, France, December 2000, specifies the RLC protocol. The RLC layer provides three services to the higher layers:
  transparent data transfer service,
  unacknowledged data transfer service, and
  acknowledged data transfer service.

In subsection 4.2.1.3 an acknowledged mode entity, AM-entity, is described (see FIG. 4.4 of the 3GPP Technical Specification). In acknowledged mode automatic repeat request, ARQ, is used. The RLC sub-layer provides ARQ functionality closely coupled with the radio transmission technique used.

$3^{rd}$ Generation Partnership Project (3GPP): *Technical Specification Group Radio Access Network,* Physical channels and mapping of transport channels onto physical channels (FDD), 3G TS 25.211 v4.6.0, France, September 2002, describes characteristics of the Layer 1 transport channels and physicals channels in the FDD mode of UTRA.

Chapter 4 describes dedicated and common transport channels, such as
  Dedicated Channel, DCH;
  Broadcast Channel, BCH;
  Forward Access Channel, FACH;
  Paging Channel, PCH;
  Random Access Channel, RACH;
  Common Packet Channel, CPCH; and
  Downlink Shared Channel, DSCH.

Chapter 5 defines a radio frame and a slot on the physical channel according to the 3GPP technical specification:
  A radio frame is a processing duration, which consists of 15 slots. The length of a radio frame corresponds to 38400 chips.
  A slot is a duration, which consists of fields containing bits. The length of a slot corresponds to 2560 chips.

The specification defines two uplink dedicated physical channels:
  uplink Dedicated Physical Data Channel, uplink DPDCH; and
  uplink Dedicated Physical Control Channel, uplink DPCCH.

The 3GPP technical specification explains,
  "The uplink DPDCH is used to carry the DCH transport channel. There may be zero, one, or several uplink DPDCHs on each radio link.
  The uplink DPCCH is used to carry control-information generated at Layer 1. The Layer 1 control information consists of known pilot bits to support channel estimation for coherent detection, transmit power-control (TPC) commands, feedback information (FBI), and an optional transport-format combination indicator (TFCI). The transport-format combination indicator informs the receiver about the instantaneous transport format combination of the transport channels mapped to the simultaneously transmitted uplink DPDCH radio frame. There is one and only one uplink DPCCH on each radio link."

FIG. 3 illustrates the frame structure for uplink DPDCH and DPCCH. In downlink direction DPDCH and DPCCH are time division multiplexed.

The frame structure of uplink data and control parts associated with CPCH is similar to that of uplink DPDCH and uplink DPCCH respectively.

$3^{rd}$ Generation Partnership Project (3GPP): *Technical Specification Group Radio Access Network*, Multiplexing and channel coding (FDD), 3G TS 25.212 v5.0.0, France, March 2002, describes the characteristics of the Layer 1 multiplexing and channel coding in the FDD mode of UTRA. Section 4.3 describes transport format detection. For a Coded Composite Transport Channel (CCTrCH), if the transport format set, TFS, of a Transport Channel, TrCH, contains more than one transport format, the transport format can be detected either by signaling the particular transport format using the TFCI field, by blindly detecting the transport format by use of channel decoding and CRC check or using guided detection from at least one other guiding TrCH.

$3^{rd}$ Generation Partnership Project (3GPP): *Technical Specification Group Radio Access Network*, Radio Resource Control (RRC), Protocol Specification, 3G TS 25.331 v4.7.0, France, September 2002, specifies the RRC protocol for the UE-UTRAN interface. Section 10.3.5.11 describes in tabular format Transport Channel, TrCH, Information Elements of RRC messages related to semi-static transport format information, TFI, including transmission time interval, TTI. TTI is the duration of data over which coding and interleaving is performed for a certain transport channel. According to the 3GPP technical specification, TTI is one of 10, 20, 40 and 80 ms. Section 10.3.5.80 describes transport format combination, TFC, control duration, defining a period in multiples of 10 ms frames for which the defined TFC sub-set is to be applied. Section 10.3.6.81 describes a Transport Format Combination Indicator, TFCI, combining indicator, indicating by TRUE or FALSE whether a part of TFCI, TFCI2, should be softly combined with other TFCI2 parts of the combining set. Section 10.3.6 describes corresponding Physical Channel, PhyCH or PhCH, Information Elements as applicable.

None of the cited documents above discloses a method and system of compatibly extending an existing channel structure for the radio interface adapting a static or semi-static transmission interval such that alternating TTI could be adopted to a data channel. Further, it is not revealed a method and system such that whether or not this extension is made use of could be blindly detected, not requiring additional signaling.

SUMMARY OF THE INVENTION

WCDMA and UMTS presently only supports TTIs of 10, 20, 40 or 80 ms. According to prior art, one TFCI is normally transmitted in each radio frame, i.e. once every 10 ms.

Delay problems have been identified for existing channel structure in some situations, e.g. communications according to TCP (Transmission Control Protocol), at high data rates, particularly in the uplink between UE and Node B.

Further, transmission power restrictions, particularly in uplink direction makes introduction of additional transport formats to be code multiplexed unfavorable, if not impossible.

Consequently, it is an object of this invention to introduce a backward compatible channel structure allowing for shorter than existing transmission time intervals without PAR (peak-to-average power ratio) increase.

A further object is to introduce a channel structure allowing for interchanging transmissions of radio frame structured data and sub-frame structured data, respectively.

It is also an object to introduce a sub-frame structure, the application of which may be detected without explicit signaling, in terms of transmission of additional symbols.

Finally it is an object to present an explicit method and system for detection of whether a sub-frame channel structure is applied or not.

Preferred embodiments of the invention, by way of examples, are described with reference to the accompanying drawings below.

DESCRIPTION OF PREFERRED EMBODIMENTS

WCDMA and UMTS presently only supports TTIs of 10, 20, 40 or 80 ms. Normally, one TFCI is transmitted in each radio frame, i.e. once every 10 ms. In this patent application particular radio frame TFCI is also referred to as $TFCI_{rf}$, to distinguish from particular sub-frame TFCI, referred to as $TFCI_{sf}$. In case of TTIs being integer multiples of 10 ms, the same TFCI content is repeated in the multiple radio frames for additional redundancy to be combined for increased reliability. A plurality of transport channels are generally multiplexed and coded into a Coded Composite Transport Channel, CCTrCH, for transmission on the physical channel. There is one TFCI for each CCTrCH. According to prior art, TTI is fixed for a particular TrCH.

Excessive delay may cause problems to e.g. TCP (Transmission Control Protocol).

Consequently, a problem with substantial delays of data transmissions is identified. A solution to the problem to be applied in e.g. UMTS or a WCDMA system should be backward compatible with equipment operating according to existing specifications. Such backward compatibility will provide for soft handover possibility also between Nodes B operating according to different releases and non-increased power requirement on UE at cell border. Further, for prior art 3GPP specifications there is a restriction from e.g. existing Release'99 as there is no means to indicate different TTIs for a TrCH.

A different TTI could be achieved by setting up a new code multiplexed data channel. However, this would require use of more than one code with an inherent risk of increasing PAR (peak-to-average power ratio), which is a problem particularly in uplink direction, predominantly due to power limitation of user equipment, UE.

A further problem is RRC signaling according to prior art requiring 40 ms TTI. One rationale for this interval is strict power budgets of UE to be kept also at cell border.

According to the invention the above mentioned problems are solved by introducing an alternative transmission time interval, and a corresponding sub-frame, shorter than that existing, requiring a new structure on the physical channel. A channel structure is superimposed on an existing channel structure to allow use of shorter TTIs on existing data channels, DPDCHs, without violating existing data channel TTI structure and without increasing PAR.

The smaller block size obtained will both increase likelihood of correct transmission without retransmission, and when retransmissions are needed a reduced delay is achieved due to a combined effect of increased reliability of individual transmissions and reduced round-trip time for each (re-)transmission. A particular detection algorithm compatible to existing 3GPP specifications is proposed. Autonomous UE switching between short (according to the invention) and long (according to prior art) TTI as need be will guarantee backward compatibility and RRC signaling reception.

Figure 3:
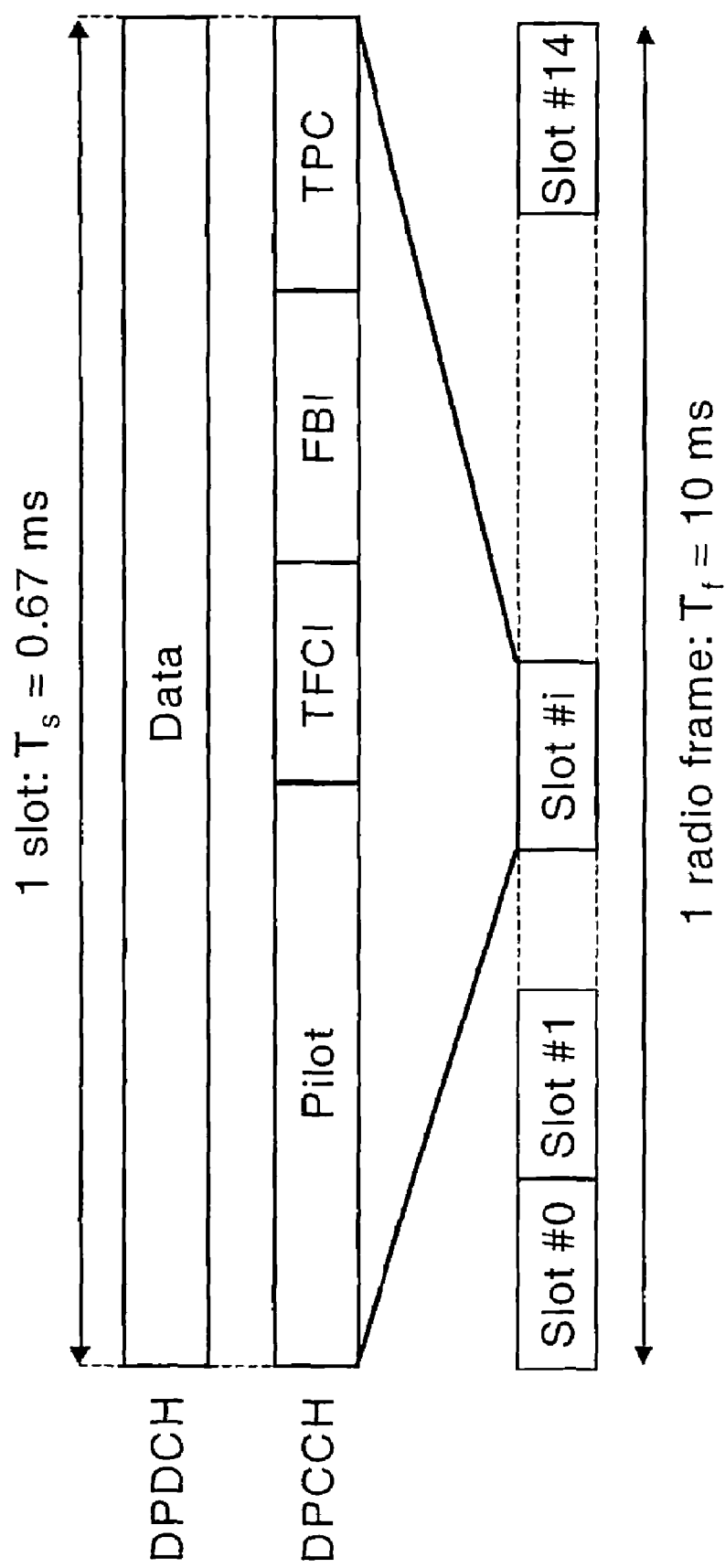
FIG. 3 illustrates the frame structure for uplink DPDCH and DPCCH, according to prior art.
Figure 4:
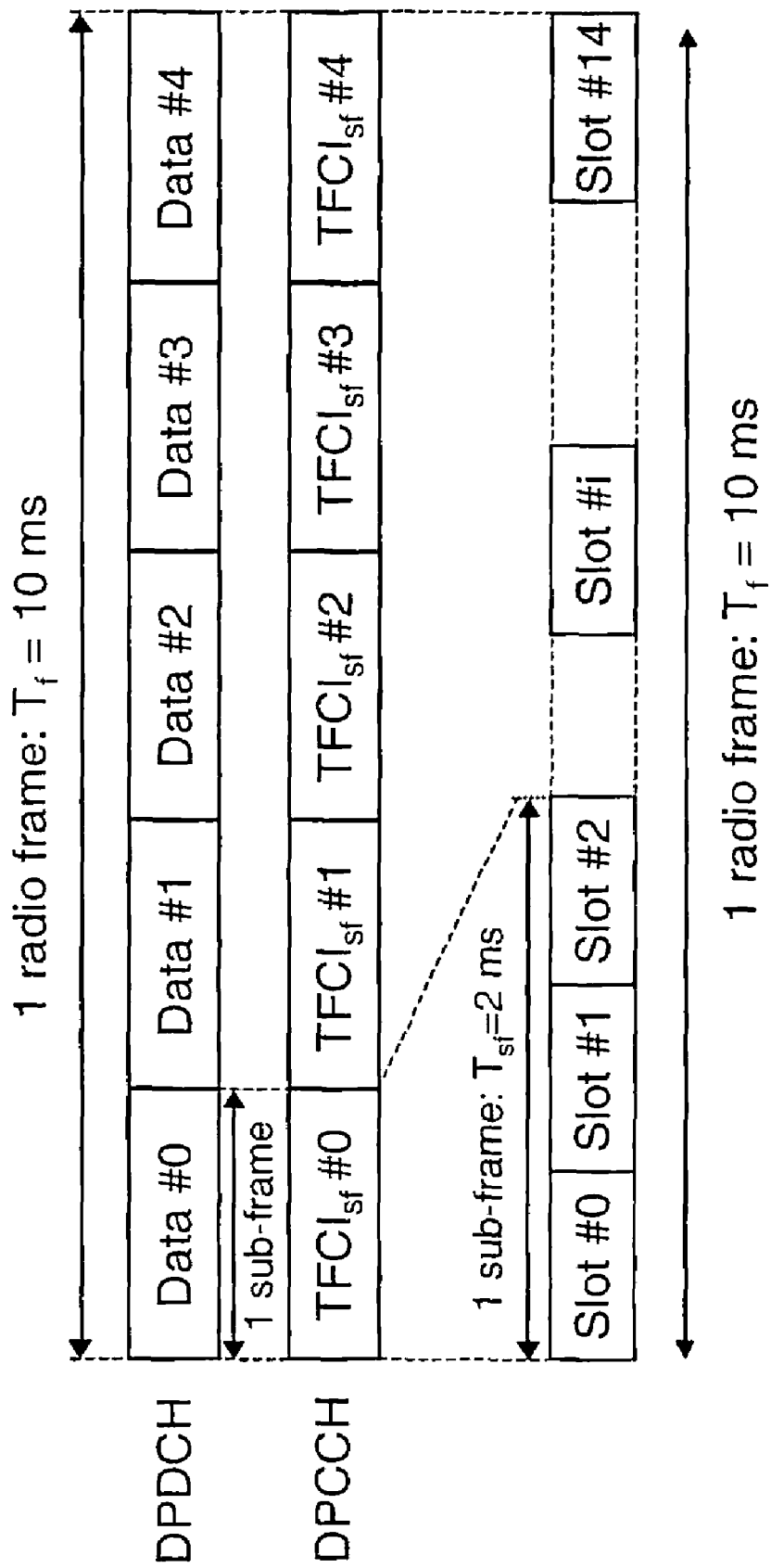
FIG. 4 shows a preferred frame and sub-frame channel structure for DPDCH and DPCCH, according to the invention.
Figure 5:
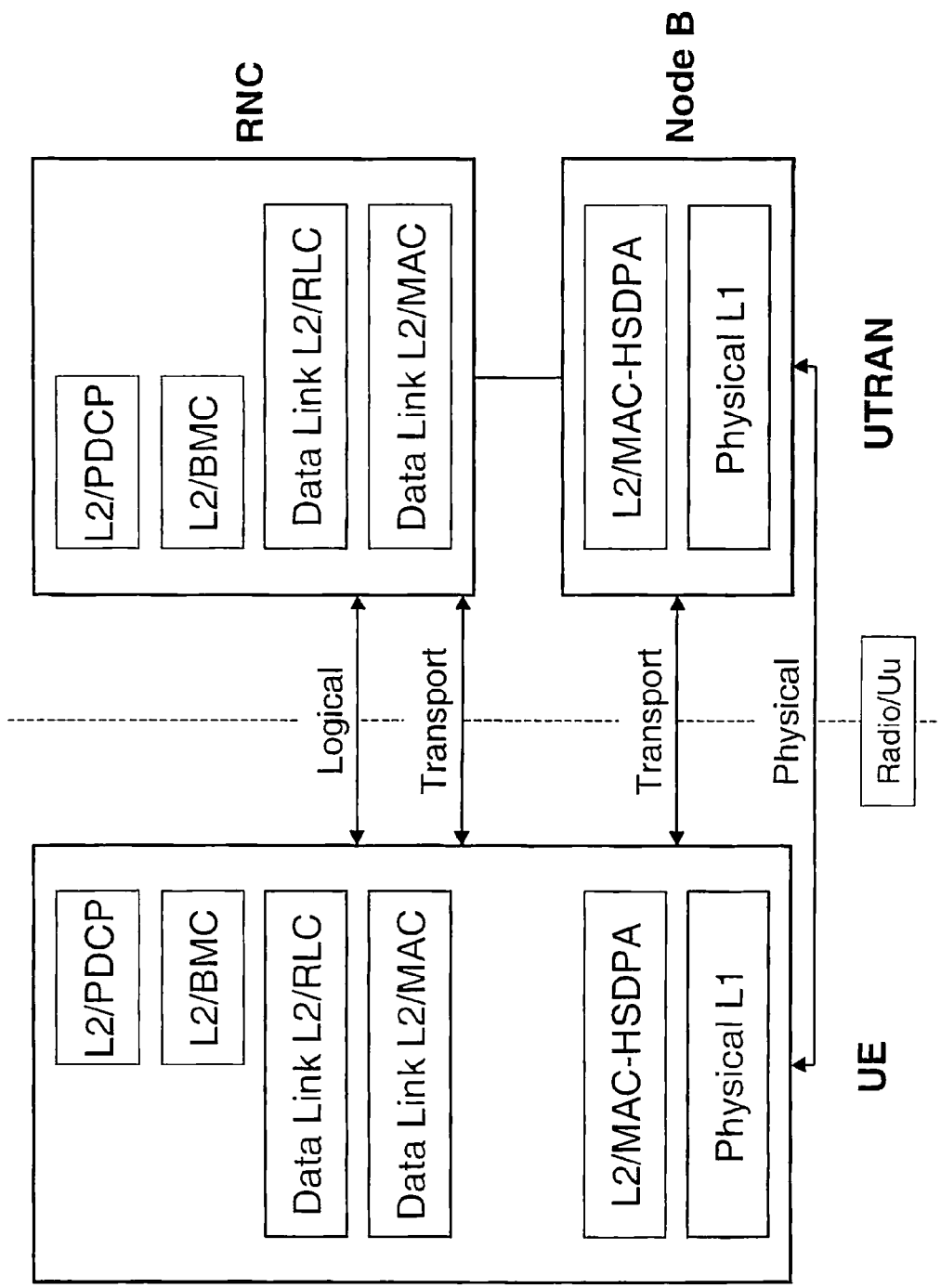
FIG. 5 displays a layered protocol structure, according to the invention, in a radio communication system.

FIG. 4 illustrates a preferred channel structure according to the invention. Compared to prior art channel structure, as illustrated in FIG. 3, a radio frame according to the preferred embodiment of the invention is divided into an integer number of equally sized sub-frames, each sub-frame comprising an integer number of slots. Exemplary 15 slots per frame, in accordance with 3GPP technical specifications, can be factored, giving three possible sub-frame sizes of 3 or 5 slots respectively. According to the invention a preferred sub-frame size comprises 3 slots, i.e. there are 5 sub-frames of a radio frame, each sub-frame having a duration of 10/5=2 ms. Of course, unequally sized sub-frames of a radio frame is also a possibility, however less preferred.

Both DPDCH and DPCCH are divided into the sub-frame structure. With preferred 5 sub-frames there are consequently 5 data blocks, <<Data #0>>, <<Data #1>>, <<Data #2>>, <<Data #3>>, <<Data #4>>.

According to the preferred embodiment TFCI of the sub-frame channel structure, $TFCI_{sf}$ is included in every transmitted sub-frame of DPCCH. In an alternative embodiment, there is only needed to transmit $TFCI_{sf}$ at $TFCI_{sf}$ changes. However, as such changes may occur for every sub-frame the sub-frame channel structure allows for at least one $TFCI_{sf}$ in each sub-frame, <<$TFCI_{sf}$ #0>>, <<$TFC_{sf}$ #1>>, <<$TFCI_{sf}$ #2>>, <<$TFCI_{sf}$ #3>>, <<$TFCI_{sf}$ #4>>.

The blind TTI detection according to the invention may be used with known technologies of TFCI detection according to 3GPP technical specification.

Figure 6:
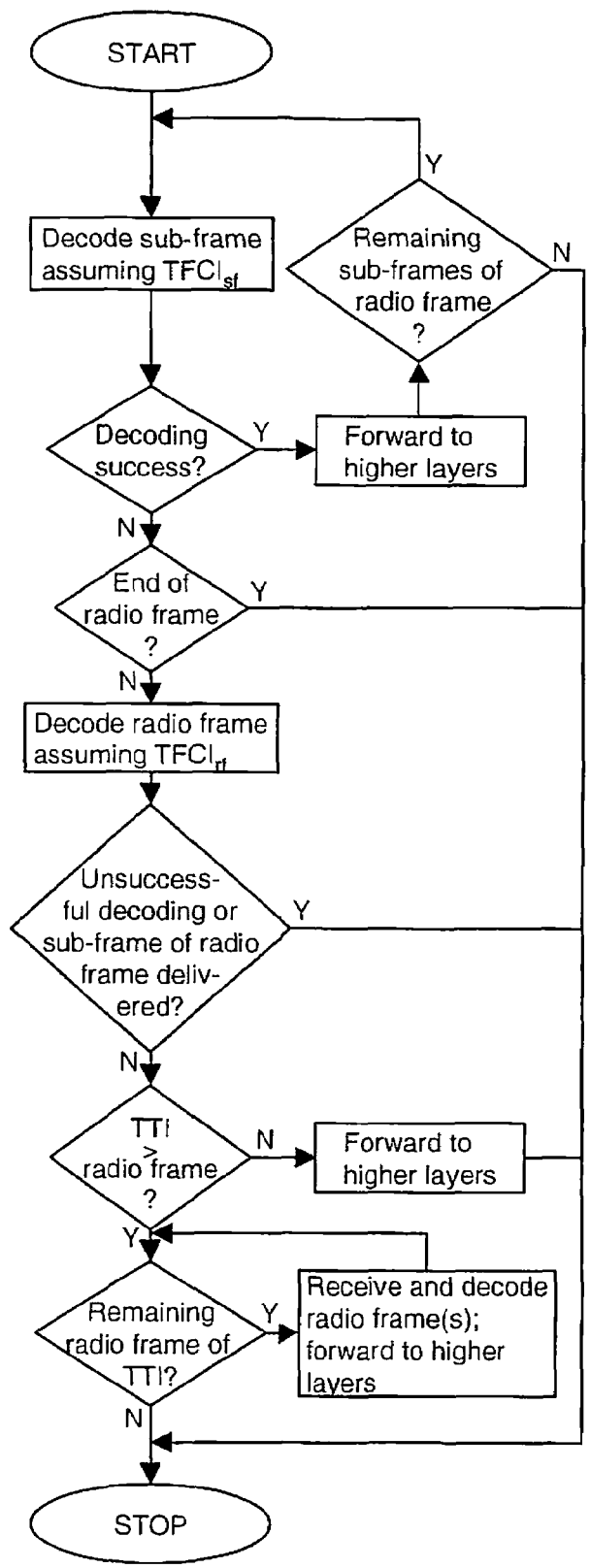
FIG. 6 shows a flow chart schematically illustrating detection according to a preferred embodiment of the invention.

The TFCI field of the slot structure according to 3GPP technical specifications comprises two bits per slot. For TTI being an integer multiple of a radio frame, TFCIrf consequently comprises 15·2=30 bits. The $TFCI_{rf}$ bits are FEC encoded such that the 30 bits represent 10 information bits. I.e., 1024 transport format combinations can be represented by $TFCI_{rf}$. For the example of sub-frames comprising three slots, $TFCI_{sf}$ would comprise 6 bits, given that two bits of each slot carry TFCI bits. Depending on FEC coding, these TFCI bits would represent at most 64 transport format combinations. With redundancy included, typically 4 or 8 transport format combinations can be represented. Circumventing need for spending TFCI bits on explicit signaling of TTI allows maximal flexibility of transport formats. FIG. 6 shows a flow chart schematically illustrating detection according to a preferred embodiment of the invention.

The receiver initially anticipates received TFCI field comprises $TFCI_{sf}$ data and detects, by decoding of the first slots on DPDCH corresponding to a first sub-frame, if any, whether or not there is a sub-frame of the received transmission. Each data channel sub-frame is protected by forward error control coding. This enables the receiver to correct and/or detect transmission errors. Only some symbol combinations are valid codewords. If a symbol combination is not among the considered correct codewords after decoding a transmission error can be detected. However, if e.g. a radio frame codeword, not comprising a sub-frame codeword in its first slots, is transmitted this will appear as a transmission subject to transmission errors to a decoder assuming a sub-frame codeword being transmitted. This relationship is utilized in the preferred embodiment of the receiver operating according to the flow chart of FIG. 6 for determining whether or not a sub-frame structure is superimposed on the prior art radio frame structure.

If decoding is successful, it is a great probability for a superimposed sub-frame structure and the decoded sequence is accepted as a valid codeword. Data transmitted in the sub-frame on DPDCH (see FIG. 4) is decoded using $TFCI_{sf}$ information and forwarded to higher layers. Once a sub-frame structure is detected the decoding continues for all sub-frames of the radio frame. After the last sub-frame of the radio frame, the process is halted for that radio frame. The process is repeated for next received one or more radio frames.

However, if the initially assumed sub-frame on DPDCH is not successfully decoded and not all assumed sub-frames have been decoded, the initial assumption of a superimposed sub-frame structure on the transmission is rejected and a radio frame structure according to prior art is assumed. This assumption is investigated by decoding entire TTI assuming received TFCI relates to $TFCI_{rf}$ data of radio frame structured transmission on DPDCH and, if DPDCH decoding is successful, decoding one or more DPDCH radio frames for a transmission time interval as indicated by TFCI. If TTI is one radio frame, once the DPDCH radio frame is decoded it is forwarded to higher layers and the decoding process halted and restarted for the next one or more radio frames. If TTI is greater than one radio frame, the entire TTI on DPDCH is decoded and forwarded to higher layers prior to halting the process and restarting for next one or more radio frames. Otherwise, no more data is passed to higher layers and the process ends to restart for next one or more radio frames.

By decoding all radio frames of a transmission time interval, when there is no sub-frame structure superimposed, prior to restarting the process for next one or more radio frames an advantage of speeding up the decoding is achieved as sub-frame decoding can then be omitted.

Figure 7:
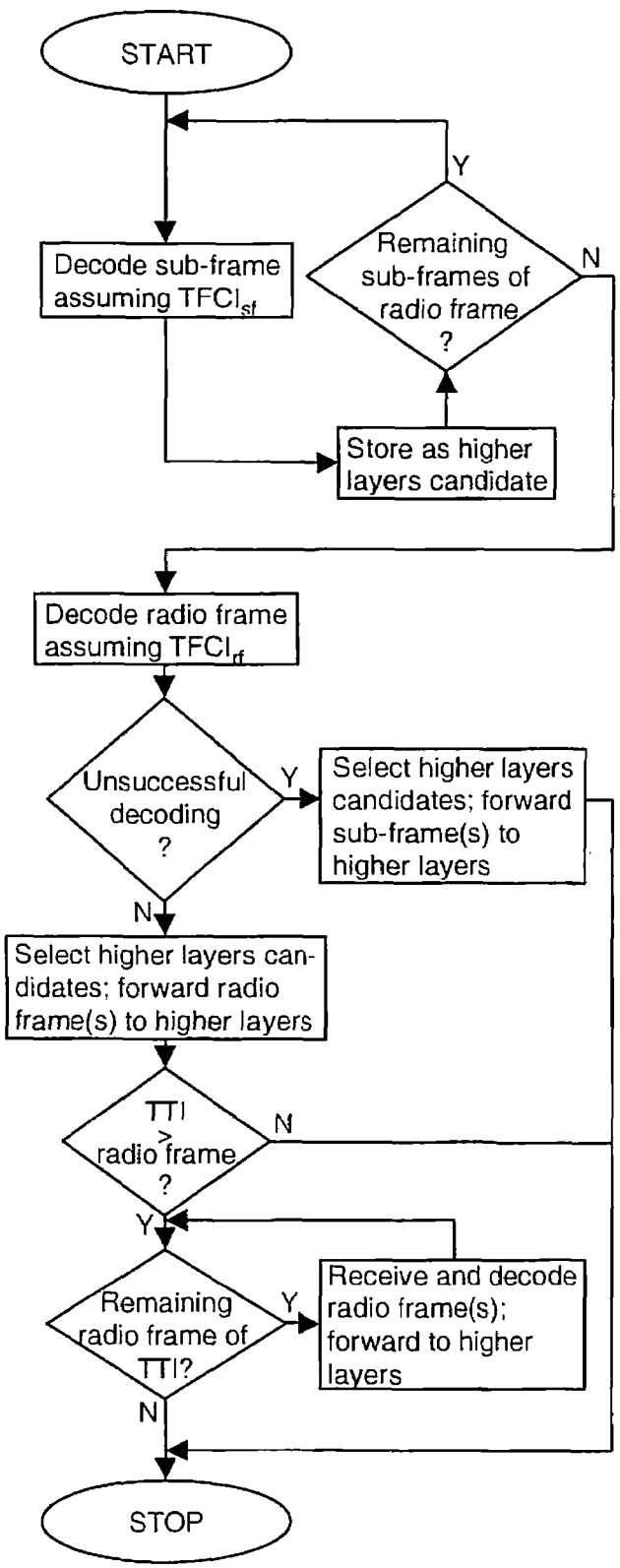
FIG. 7 shows a flow chart schematically illustrating detection according to an alternative embodiment of the invention.

According to a second embodiment, the sub-frame and radio frame decoding are non-exclusive. This is illustrated in FIG. 7 reflected in that condition <<End of radio frame?>> of FIG. 6 is excluded and step <<Decode radio frame $TFCI_{rf}$>> entered unconditionally when all sub-frames of a radio frame have been candidate decoded. The outcomes of decoding sub-frames and entire radio frame, respectively, are weighted and compared and the outcome (entire radio frame or one or more sub-frames) with greatest likelihood of being correct is selected in step <<Select higher layers candidates; forward to higher layers>>. One such comparison would be to select between whether or not a sub-frame channel structure is superimposed depending on, which of the alternatives would correspond to the smallest number of transmission errors. In FIG. 7, TTI comprising a plurality of radio frames does not include candidate(s) selection for more than first radio frame. However, more radio frames of TTI could be included at the expense of increased buffering. When a radio frame is TFCI detected only one radio frame (the first) of TTI is required to be detected.

According to a third embodiment a majority vote on the sub-frame decoding attempts of a received radio frame is determined prior to any decoding attempt of an entire radio frame. If, e.g., 3-5 out of 5 sub-frames are correctly decoded, transmissions are considered according to a sub-frame structure. Depending on false alarm rate and miss rate the vote threshold may be adjusted, e.g. requiring 4-5 correctly decoded sub-frames for considering data sent according to the sub-frame structure.

The preferred, second and third embodiments described above may be referred to as blind detection. However, it should be noted that according to the invention only TTI detection is blind. Once TTI is determined, $TFCI_{rf}$ and $TFCI_{sf}$, respectively, is used to inform the receiver on control information, e.g. code rate.

On the transmitting side the terminal preferably decides whether or not to make use of the sub-frame channel structure according to needs and radio environment. The decision is based on one or more aspects such as available transmit power, transmission activity on channels requiring radio frame channel structure without sub-frame channel structure.

As an alternative to blindly detecting whether a sub-frame structure is superimposed or not, this could be signaled through differences between $TFCI_{rf}$ and $TFCI_{sf}$. To achieve sufficiently high reliability, there a distance measure is considered. The greater the distance, the greater the reliability. The smallest distance between any TFCI and any $TFCI_{sf}$ is determined in terms of number of differing positions. Two non-exclusive alternatives for increasing the distance beyond what TFCI field according to prior art alone allows for are considered:

The distance is increased by utilizing bits of slot FBI-field for $TFCI_{sf}$.

The distance is increased by using different pilot sequences depending on whether or not a sub-frame structure is imposed or not.

As an alternative, the above-mentioned increase of $TFCI_{sf}$ field size could, wholly or partially, be used for allowing more transport format combinations, at the expense of a smaller distance increase.

Irrespective of which method is used for detection (blind detection or TFCI difference), each received sub-frame is preferably acknowledged (positively or negatively) by the receiver, when a sub-frame structure is superimposed. A transmitter of an earlier release will simply ignore such unknown acknowledgments.

A problem related to hybrid ARQ, combining subsequent decodings for increased reliability causes another problem related to the superimposed sub-frame structure. According to the preferred embodiment, need for dual buffers to store also a superimposed sub-frame structure, with capacity of changing the decision until all sub-frames of a radio frame is received, is eliminated. Due to great reliability of the error detecting code, and the preferred constant sub-frame size of all sub-frames of a radio frame, the decision is made on DPDCH data from the first sub-frame. If this sub-frame is indicated to be a valid codeword, the sub-frame structure is anticipated to hold for the entire radio frame and the hybrid ARQ buffer(s) reserved for sub-frame combining. The drawback of this solution is obviously that an erroneous decision based on only one sub-frame could ruin an entire radio frame, if there is no sub-frame channel structure of the transmission.

An alternative solution to this problem is to only allow soft combining of consecutive transmissions for sub-frame TTIs, excluding TTIs being integer multiples of the duration of a radio frame for hybrid.ARQ. For reasons of symmetry, buffer savings could alternatively be achieved by only allowing hybrid ARQ for TTIs being integer multiples of a radio frame. A drawback of both these alternative solutions is that if retransmission of data need to occur without possibility to retransmit using a sub-frame channel structure, retransmissions cannot be softly combined. This may be the case e.g. due to mobility (some Nodes B may not have implemented a sub-frame channel structure or UE is strictly power limited if moved close to cell border).

L2 MAC layer can request retransmission of transmission units received in error. Preferably hybrid ARQ, utilizing information available from earlier transmission(s) of a transmission unit by proper combining with the latest retransmission, is used prior to an L2 MAC layer request for retransmission.

Figure 8:
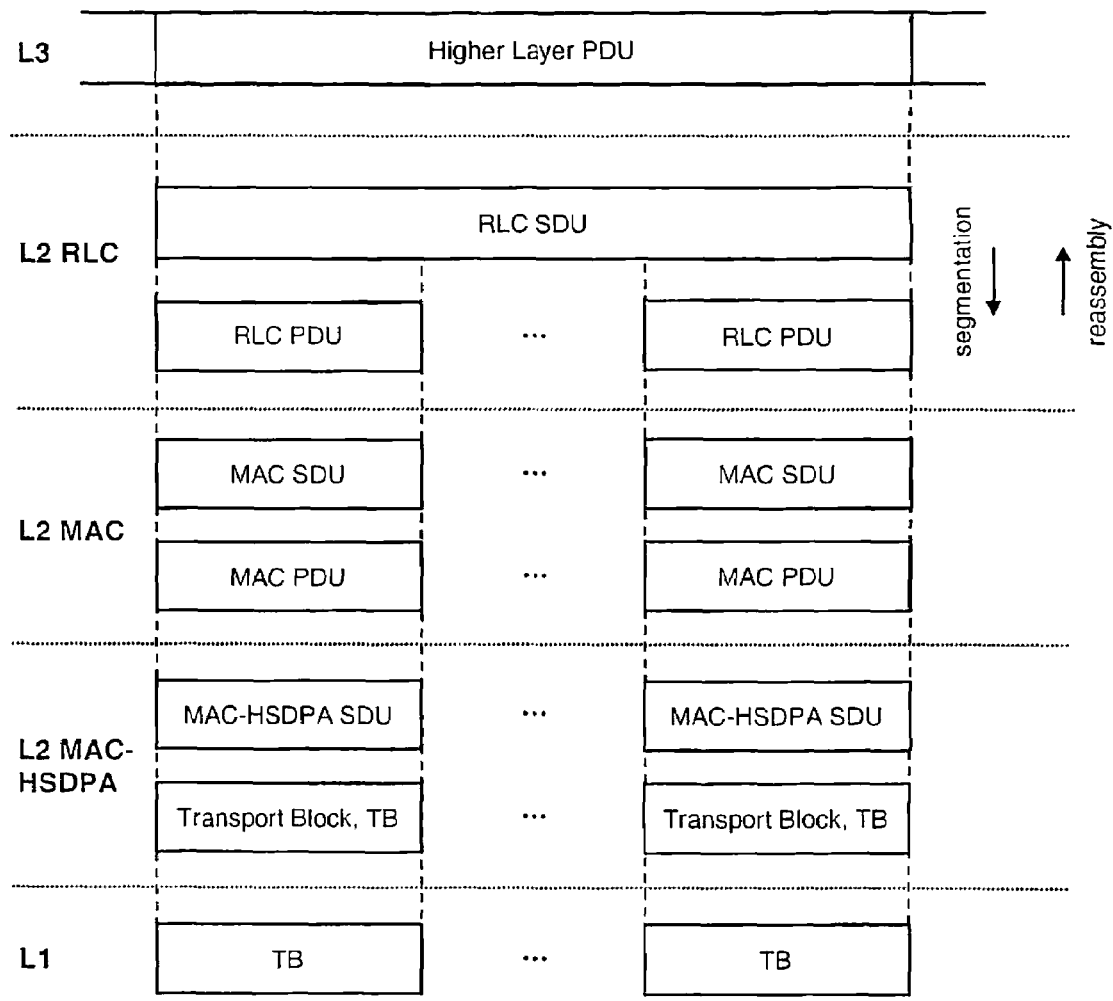
FIG. 8 schematically illustrates MAC and RLC protocol layers in a multilayer protocol structure.

At the receiving end, error detection is also performed by layer L2 RLC of FIG. 8. If an RLC protocol data unit, PDU, is received in error or the PDU is missing, it will be requested for retransmission at a point in time when a status report is established by the RLC layer. RLC PDUs are transferred to/from the MAC layer SDUs. The MAC SDU possibly includes a header not included in the RLC PDU. A network layer PDU or L3 PDU can comprise several RLC PDUs, as illustrated in FIG. 8. RLC PDUs are reassembled into RLC service data units, RLC SDU, prior to delivery to higher layer PDU. The L3 protocol can be, e.g., the Internet Protocol, IP. Upon reception from L3, RLC SDUs are segmented into RLC PDUS.

Figure 1:
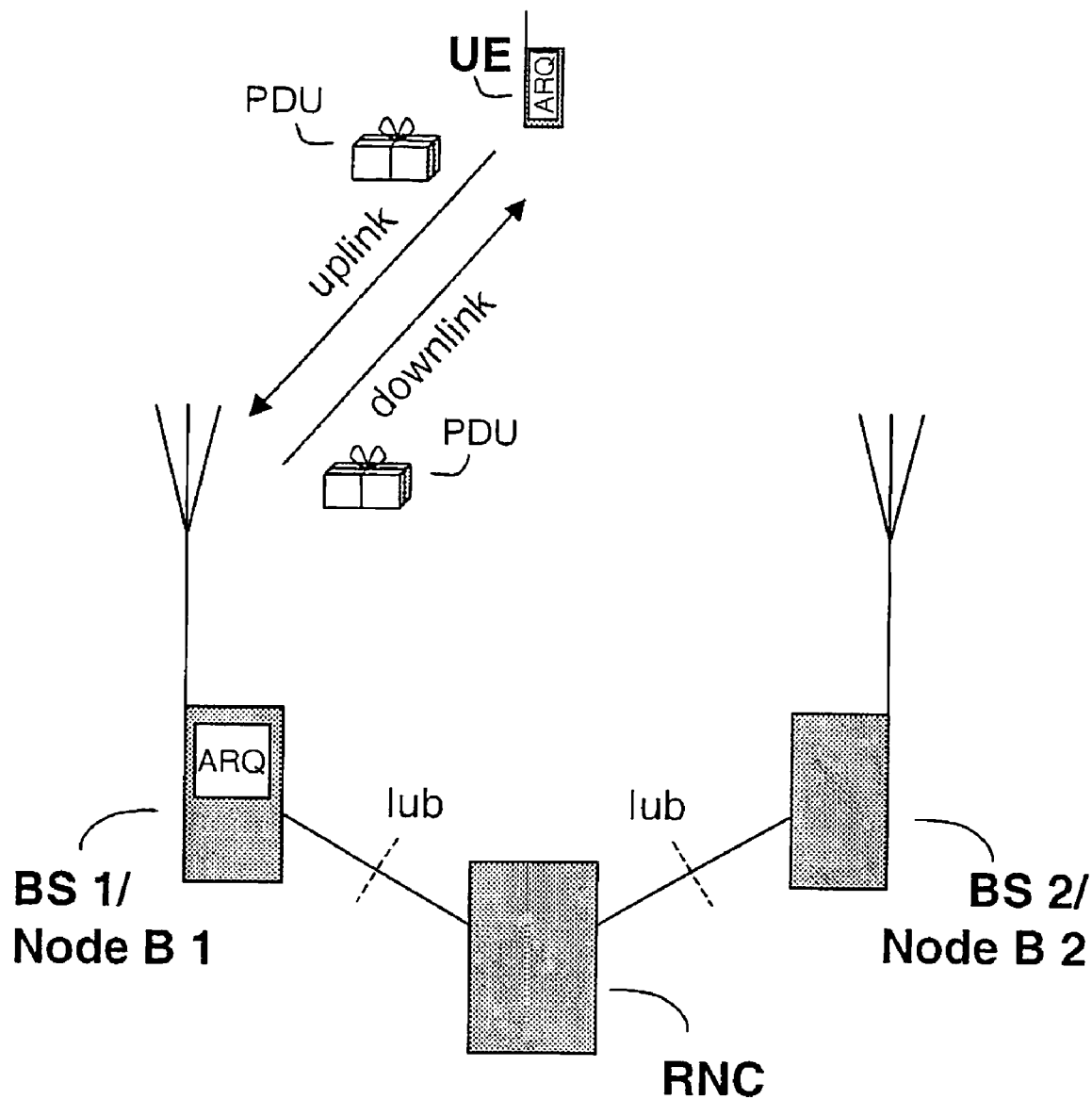
FIG. 1 shows communication, according to the invention, between a UE and a base station involved in a connection between an RNC and the UE.
Figure 2:
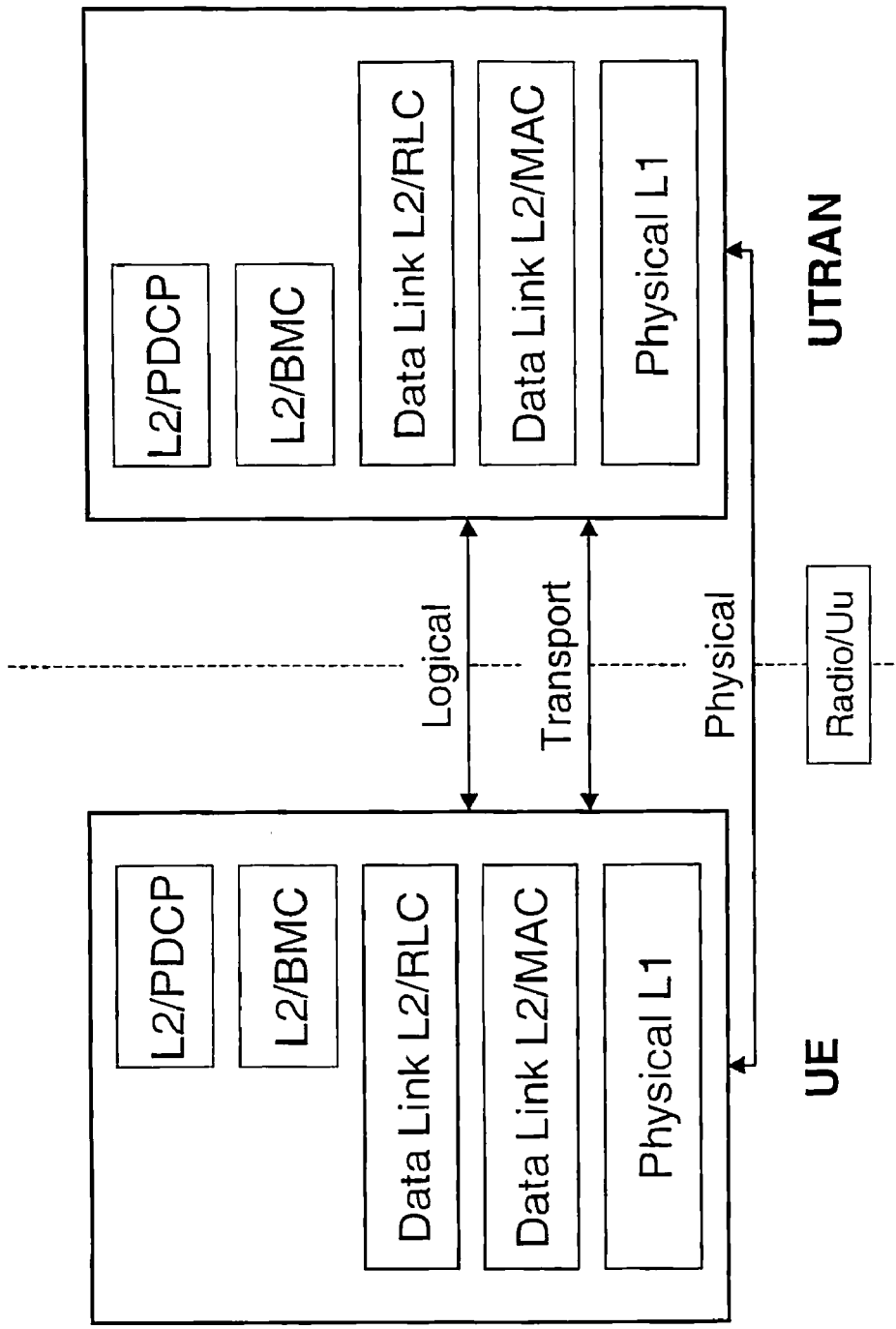
FIG. 2 displays a layered protocol structure, according to prior art, in a radio communications system.

One reason for terminating the Fast Hybrid ARQ in Node B, as illustrated in FIG. 1 is the reduction of roundtrip delay as compared to terminating it in RNC. Another reason is that Node B is capable of using soft combining of multiply transmitted data packets, whereas RNC generally only receives hard-quantized bits.

Preferably, all Nodes B and UEs of the radio communications system operate according to the invention for outstanding performance. However, the invention can also be used in systems also including Nodes B not operating according to the invention.

A person skilled in the art readily understands that the receiver and transmitter properties of a BS or a UE are general in nature. The use of concepts such as BS, UE or RNC within this patent application is not intended to limit the invention only to devices associated with these acronyms. It concerns all devices operating correspondingly, or being obvious to adapt thereto by a person skilled in the art, in relation to the invention. As an explicit non-exclusive example the invention relates to mobile stations without a subscriber identity module, SIM, as well as user equipment including one or more SIMs. Further, protocols and layers are referred to in close relation with UMTS terminology. However, this does not exclude applicability of the invention in other systems with other protocols and layers of similar functionality.

The invention is not intended to be limited only to the embodiments described in detail above. Changes and modifications may be made without departing from the invention. It covers all modifications within the scope of the following claims.

The invention claimed is:

1. A method of transmitting data according to a sub-frame channel structure wherein, for a radio frame channel structure of a data channel and a control channel, said method comprises the steps of:
   a first transmission time interval being an integer multiple of the duration of a radio frame; and,
   a second transmission time interval smaller than the first transmission interval and corresponding to the duration of a sub-frame are defined
   wherein the sub-frame channel structure is applied with the second transmission time interval on the same data channel for which the first transmission time interval may be applied, allowing the first and second transmission time intervals to interchange for different radio frames of the same data channel.

2. The method according to claim 1, wherein said sub-frame channel structure is superimposed on the radio frame channel structure.

3. The method according to claim 1, wherein said transmission time interval is changed without transmitting explicit control signaling, comprising information on second time interval, on the control channel.

4. The method according to claim 1, wherein said transport format combination information according to the sub-frame channel structure is transmitted if transport format combination information has been changed since most recently transmission time interval and is not transmitted if transport format combination information has not changed.

5. The method according to claim 1, wherein symbol intervals corresponding to symbol intervals of slots representing transport format combination information according to the radio frame channel structure are representing transport format combination information according to the sub-frame channel structure.

6. The method according to claim 1, wherein one or more symbol intervals of feedback information or pilot sequence of one or more radio frame channel structure slots are reallocated to represent transport format combination information on the sub-frame channel structure.

7. The method according to claim 1, wherein received sub-frames are acknowledged to data transmitter.

8. A method of detecting a sub-frame channel structure transmission time interval, comprising the steps of:
   for a data channel, one or more slots corresponding to a transmission time interval of a sub-frame channel structure are received and, for a control channel, one or more transmission format control symbols of the one or more slots corresponding to those of the data channel are received; and,
   a candidate decoding of a first data channel sub-frame is performed assuming transport format control information being in accordance with the transport format control information of a corresponding control channel sub-frame of the sub-frame channel structure.

9. The method according to claim 8, wherein said method allows detection of inter-change of first and second transmission time intervals for different radio frames of the same data channel, the second transmission time interval corresponding to the duration of a sub-frame and being smaller than the first transmission time interval.

10. The method according to claim 8, wherein the sub-frame channel structure transmission time interval is detected without transmitting explicit control signaling, comprising information on second time interval, on the control channel.

11. The method according to claim 8, wherein candidate decoded sub-frame data is stored.

12. The method according to claim 11, wherein all sub-frames of a radio frame are candidate decoded.

13. The method according to claim 8, wherein when said one or more sub-frames of a radio frame have been candidate decoded, for the data channel the radio frame is candidate decoded assuming transport format control information being in accordance with transport format control information of a corresponding control channel radio frame of the radio frame channel structure.

14. The method according to claim 8, wherein, depending on the outcome of the candidate one or more decodings, for the data channel a transmitted radio frame is selected according to a metric or cost function.

15. The method according to claim 14, wherein the metric or cost function reflects probability of selected data being transmitted.

16. The method according to claim 14, wherein the metric or cost function reflects probability of decoded data conditioned by received data.

17. The method according to claim 14, wherein the metric or cost function reflects a fraction of successfully decoded sub-frames of a radio frame.

18. The method according to claim 17, wherein the fractional metric or cost function is a majority vote.

19. The method according to claim 14, wherein if data is considered to be radio frame structured data and not being sub-frame structured, transmission time interval is determined from transport format combination information according to the radio frame structure, and if transmission time interval is greater than radio frame duration, remaining one or more radio frames of the transmission time interval are received and decoded according to the radio frame channel structure.

20. The method according to claim 19, wherein no candidate decoding assuming a sub- frame channel structure are undertaken for the remaining radio frames of the transmission time interval.

21. The method according to claim 8, wherein if the sub-frame candidate decoding of the data channel sub-frame is successful, candidate decoded sub-frame data is forwarded to higher layers.

22. The method according to claim 21, wherein subsequent sub-frames of a radio frame are candidate decoded until candidate decoding of a sub- frame fails or all sub-frames of received radio frame have been decoded.

23. The method according to claim 22, wherein failed decoding indicating candidate decoded data not being valid data of a sub-frame according to the sub-frame channel structure.

24. The method according to claim 8, wherein if the sub-frame candidate decoding of the data channel sub-frame is unsuccessful, for the data channel the radio frame is candidate decoded assuming transport format control information being in accordance with transport format control information of a corresponding control channel radio frame of the radio frame channel structure.

25. The method according to claim 24, wherein if candidate decoding of radio frame structured data and not being assumed sub-frame structured, transmission time interval is determined from transport format combination information according to the radio frame structure.

26. The method according to claim 25, wherein if transmission time interval is greater than radio frame duration, remaining one or more radio frames of the transmission time interval are received and decoded according to the radio frame channel structure.

27. The method according to claim 26, wherein no candidate decoding assuming a sub-frame channel structure is performed for the remaining radio frames of the transmission time interval.

28. The method according to claim 26, wherein decoded data is forwarded to higher layers.

29. A signal format for transmission of data and control signaling, wherein the signal format comprises a radio frame structure and a superimposed sub-frame structure, the radio frame being of a first duration and the sub-frame being of a second duration shorter than the first duration, the data part comprising information sufficient for determining whether or not transmissions are according to the superimposed sub-frame structure;

wherein the sub-frame structure comprises transport format control information if the information has chancjed from an earlier transmission time interval, corresponding to the second duration or an integer multiple of the first duration.

30. The signal format according to claim 29, wherein the data and control signaling is transmitted on a data channel and control channel respectively.

* * * * *